United States Patent
Matsuura (12) 
(10) Patent No.: US 6,826,129 B1
(45) Date of Patent: Nov. 30, 2004

(54) METHOD AND APPARATUS FOR RECORDING MAGNETIZED MARK UTILIZING MAGNETIC FIELD GENERATED BY ADJACENT MAGNETIZED MARK TO REDUCE ENERGY LEVEL FOR GENERATING PULSED MAGNETIC FIELD

(75) Inventor: Michio Matsuura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/627,270

(22) Filed: Jul. 28, 2000

(30) Foreign Application Priority Data

Sep. 3, 1999 (JP) .......................................... 11-249566

(51) Int. Cl.⁷ .......................... G11B 13/04; G11B 11/12
(52) U.S. Cl. ................................ 369/13.14; 369/13.22; 360/59
(58) Field of Search ................................ 369/13, 13.22, 369/13.49; 360/59

(56) References Cited

U.S. PATENT DOCUMENTS

| | | | |
|---|---|---|---|
| 5,091,896 A | | 2/1992 | Takayama ................. 369/13.22 |
| 5,121,369 A | * | 6/1992 | Makansi ...................... 369/13 |
| 5,239,524 A | | 8/1993 | Sato et al. ................. 369/13.22 |
| 5,278,809 A | * | 1/1994 | Ogata ....................... 369/13.22 |
| 5,331,612 A | | 7/1994 | Murakami et al. |
| 5,377,172 A | * | 12/1994 | Hino et al. ................... 369/13 |
| 5,661,612 A | * | 8/1997 | Hasegawa et al. ............. 360/59 |
| 5,724,319 A | * | 3/1998 | Fuji et al. |
| 5,886,958 A | * | 3/1999 | Yonezawa et al. ............. 369/13 |
| 5,932,364 A | * | 8/1999 | Hirokane et al. ..... 369/13.49 X |
| 6,101,153 A | * | 8/2000 | Shimazaki et al. ......... 369/13.1 |
| 6,246,640 B1 | * | 6/2001 | Shimazaki et al. ............ 369/13 |
| 6,424,601 B1 | * | 7/2002 | Oonuki et al. ............ 369/13.08 |
| 6,477,118 B1 | * | 11/2002 | Awano et al. ............. 369/13.14 |

FOREIGN PATENT DOCUMENTS

| | | | | |
|---|---|---|---|---|
| JP | 61187141 | | 8/1986 | |
| JP | 63074146 | | 4/1988 | |
| JP | 1241051 | | 9/1989 | |
| JP | 1319149 | | 12/1989 | |
| JP | 3127347 | | 5/1991 | |
| JP | 6044630 | | 2/1994 | |
| JP | 6203418 | | 7/1994 | |
| JP | 02419 | * | 1/1998 | ........... G11B/11/00 |
| JP | 10-55580 | * | 2/1998 | ........... G11B/11/10 |

OTHER PUBLICATIONS

English Translation of JP 3–127347.*
MAT of JP 10–55580.*

* cited by examiner

*Primary Examiner*—Aristotelis M. Psitos
(74) *Attorney, Agent, or Firm*—Greer, Burns & Crain, Ltd.

(57) ABSTRACT

A method and apparatus for magnet-optical recording are provided that can reduce heat in pulse driving of a magnetic head coil of a magnet-optical recording apparatus. Data inversion detection means 41–44 generates a signal TRDET that becomes the high level when a magnetic inversion of data occurs and becomes the low level when no magnetic inversion of data occurs. Means for reducing an exciting energy 45–47 use this signal TRDET so as to generate a strobe signal STRB that has a short period of the high level when a magnetic inversion of data occurs and a normal period of the high level when no magnetic inversion of data occurs. The magnetic head coil is excited during a period in which the strobe signal STRB is the high level, so that the pulsed magnetic field is generated, which is applied to a magnet-optical recording medium.

7 Claims, 12 Drawing Sheets

Fig. 1

Prior Art

METHOD AND APPARATUS FOR RECORDING MAGNETIZED MARK UTILIZING MAGNETIC FIELD GENERATED BY ADJACENT MAGNETIZED MARK TO REDUCE ENERGY LEVEL FOR GENERATING PULSED MAGNETIC FIELD

BACKGROUND OF THE INVENTION

1. Field of the Invention

The present invention relates to a method and an apparatus for magnet-optical recording. More specifically, the present invention relates to a method and an apparatus for magnet-optical recording, in which magnetized marks are recorded on a magnet-optical recording medium by using a pulsed magnetic field and by irradiating a pulsed light beam.

2. Description of the Prior Art

A magnet-optical recording apparatus (a magnet-optical disk drive), especially a magnetic field modulation type magnet-optical recording apparatus has a high recording density and enables high speed data transmission, so it is expected to be a main stream of recording media in a computerized society. However, it is important to improve the magnetic inversion speed of a magnetic head in order to take advantage of the high transmission speed.

In general, an optical head for irradiating a laser beam to a magnet-optical recording medium and a magnetic head for applying a magnetic field are disposed at the opposite sides with respect to the magnet-optical recording medium. Therefore, it is difficult to position the laser beam spot and the magnetic head precisely because of a registration error and an eccentricity. Accordingly, the magnetic head is usually made larger (e.g., approximately 200 $\mu$m×200 $\mu$m) so that the effective area of the magnetic field applied by the magnetic head can cover the movable area of the laser beam spot.

As a result, an inductance of the magnetic head increases, and the magnetic inversion speed becomes slow. In order to avoid an imprecise edge of the magnetized mark due to the slow magnetic inversion speed, a method is invented in which a pulsed laser beam is used for writing a magnetized mark when the magnetic field is large (see Japanese patent publication No. 7-21892, for example).

Figure 1:
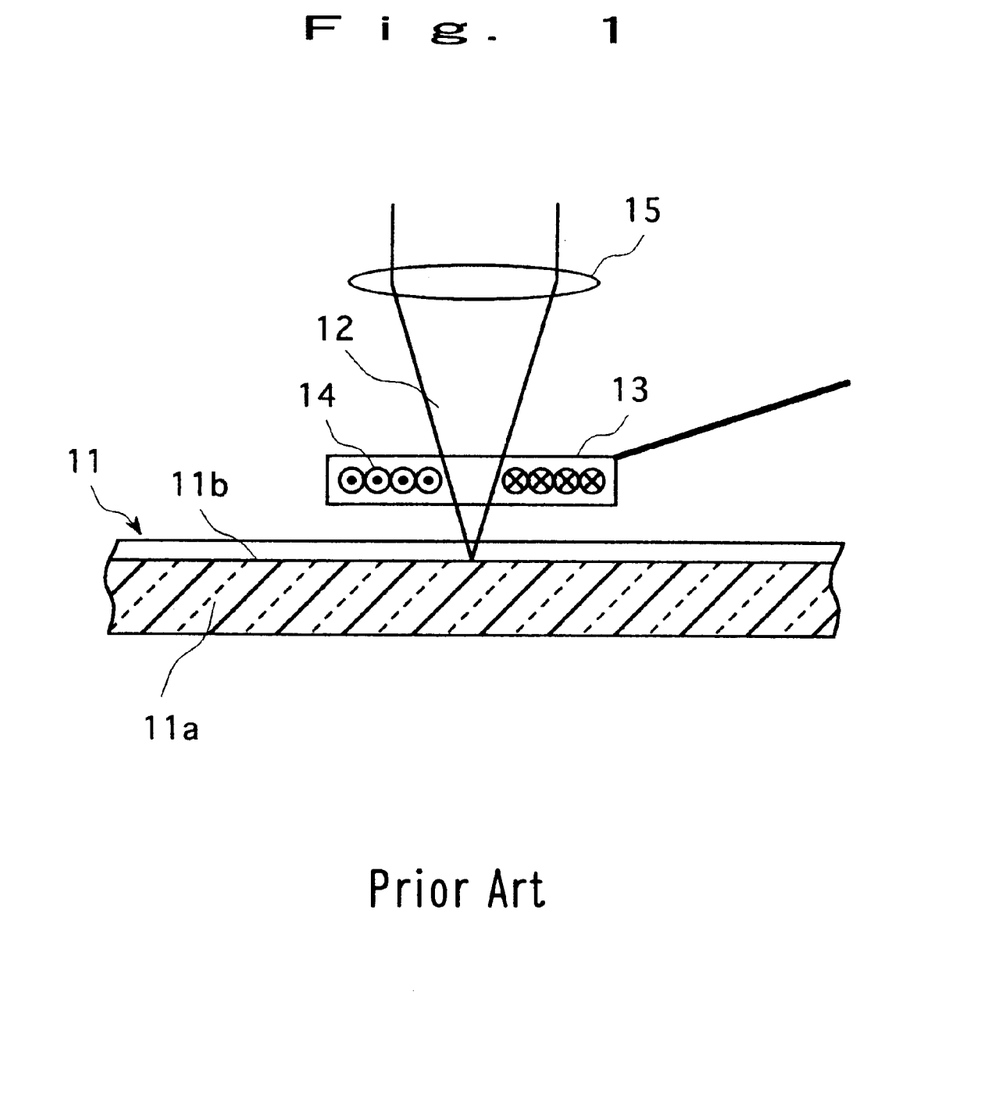
FIG. 1 is a cross section of a conventional magnet-optical recording apparatus utilizing a front illumination method.

In addition, a front illumination method as shown in FIG. 1 is invented for further improving the data transmission. In this method, a small magnetic head is arranged at the laser beam irradiation side of the magnet-optical recording medium. Namely, as shown in FIG. 1, the magnet-optical recording medium 11 is irradiated by the laser beam 12 not at the transparent substrate 11a side but at the recording layer 11b side above which the magnetic head 13 is disposed. The magnetic head 13 includes a magnetic head coil 14 made of a thin film pattern. The laser beam 12 that was concentrated by a focus lens 15 passes through an opening formed in the middle portion of the magnetic head coil 14 and is irradiated onto the recording layer 11b of the magnet-optical recording medium 11.

The above-mentioned front illumination method enables the optical head including the focus lens 15 and the magnetic head 13 to be mounted on a common slider, so that the irradiation spot of the laser beam 12 and the position of the magnetic head 13 can be aligned precisely. Therefore, the effective area of the magnetic field applied by the magnetic head 13 can be small (less than 50 $\mu$m×50 $\mu$m, for example), so that an inductance of the magnetic head coil 14 can be decreased. As a result, the magnetic inversion speed can be improved.

However, since the magnetic head coil 14 is formed by a thin film technology so as to make the magnetic head 13 light and low profile, a resistance of the magnetic head coil 14 increases. A large resistance generates heat that may cause the detrimental effects such as fusing of the magnetic head coil 14, deformation of the focus lens 15 and an excessive heat of the magnet-optical recording medium 11.

In order to avoid the above-mentioned detrimental effects, a method is proposed in which a pulsed magnetic field is generated for applying the magnetic field to the magnet-optical recording medium as disclosed in Japanese Patent No. 2803841, for example. This method can suppress the heat of the magnetic head coil 14 by exciting the magnetic head coil 14 not continuously but intermittently for necessity.

However, the control of the heat of the magnetic head coil is not sufficient by the above-mentioned method. More effective method for decreasing the heat has been desired. In the conventional method, the magnetic field is required to be applied continuously from the irradiation of the pulsed light until the temperature of the recording layer of the magnet-optical recording medium becomes below the Curie point (Tc). Therefore, the heat reducing effect by the pulse driving of the magnetic head coil has a limitation.

SUMMARY OF THE INVENTION

The object of the present invention is to provide a method and an apparatus for magnet-optical recording that utilize a novel concept for reducing a heat in the pulse driving of the magnetic head coil.

According to a first aspect of the present invention, a magnet-optical recording method is provided, in which magnetized marks are recorded on a magnet-optical recording medium by irradiating a pulsed light beam onto the recording medium and by applying a pulsed magnetic field to the recording medium. This method utilizes a reverse magnetic field generated by the magnetized mark that was recorded just before the present mark so as to reduce the exciting energy of the magnetic field to be applied when the present mark is recorded in the polarity that is opposite to the polarity of the magnetized mark that was recorded just before the present mark.

When the magnetic recording film is heated above the Curie point (Tc), the heated spot can be magnetized in the polarity opposite to that of the present magnetized mark due to the influence of the magnetic field generated by the surrounding magnetized marks without application of the external magnetic field. This phenomenon is known as a reverse magnetic field phenomenon and is utilized in a so-called overwrite type magnet-optical recording medium as disclosed in Japanese patent publication No. 6-79391, Japanese unexamined patent publication No. 3-127347 or Japanese Patent No. 2630976, for example.

The above-mentioned first magnet-optical recording method of the present invention utilizes the reverse magnetic field explained above so as to reduce the exciting energy of the applied magnetic field when recording a magnetized mark having a polarity opposite to that of the magnetized mark that was recorded just before the present mark. Thus, the total heat of the magnetic head coil can be reduced.

In an embodiment of the method for reducing the exciting energy of the applied magnetic field, an exciting current that is supplied to a magnetic head coil for generating the magnetic field is reduced. In another embodiment, an exciting period of a magnetic head coil for generating the magnetic field is reduced. It is also possible that an exciting current is not supplied to a magnetic head coil for generating the magnetic field when the present mark is recorded in the polarity that is opposite to the polarity of the magnetized mark that was recorded just before the present mark.

According to a second aspect of the present invention, the magnet-optical recording method uses a magnet-optical recording medium having a recording layer and an auxiliary recording layer, and magnetized marks are recorded on the magnet-optical recording medium by applying a pulsed magnetic field to the recording medium and by irradiating a pulsed light beam onto the recording medium. The method includes the steps of recording a magnetized mark on the auxiliary recording layer by applying the magnetic field in a short pulse form in accordance with data to be recorded, and transferring the magnetized mark recorded on the auxiliary recording layer to the recording layer by irradiating a pulsed light beam.

The magnet-optical recording medium that has a recording layer and an auxiliary recording layer has been used as an optical modulation overwrite type magnet-optical recording medium as disclosed in Japanese unexamined patent publication No. 6-44630 or No. 6-203418, for example. In this magnet-optical recording medium, a magnetic field that is weak at the normal temperature is used for writing a magnetized mark on the auxiliary recording layer. After that, a laser beam is irradiated for heating the recording layer above the Curie point (Tc), so that the magnetized mark of the auxiliary recording layer can be transferred to the recording layer.

The above-mentioned magnet-optical recording method of the present invention utilizes the auxiliary recording layer for reducing the exciting power of the magnetic head coil that generates the magnetic field applied for recording magnetized marks. Namely, when recording a magnetized mark on the auxiliary recording layer, it is not needed to keep the applied magnetic field until the temperature drops below the Curie point (Tc). Therefore, the magnetic head coil can be driven by pulse and the exciting period can be shortened substantially. In general, it is said that several nanoseconds are necessary for writing a magnetized mark on the auxiliary recording layer, i.e., for magnetizing a magnetic material. Therefore, a magnetized mark is written on the auxiliary recording layer in accordance with write data by using the pulsed magnetic field, and then the magnetized mark of the auxiliary recording layer is transferred to the recording layer by irradiating the pulsed light, so that the exciting power of the magnetic head coil and the heat thereof can be reduced.

Preferably, the pulsed magnetic field is generated when a magnetic inversion of the write data occurs and just before the irradiation spot of the pulsed light deviates from the magnetized area of the auxiliary recording layer that was magnetized by the pulsed magnetic field.

The auxiliary recording layer is magnetized over the effective area of the applied magnetic field that is approximately several dozens microns including the irradiation spot. Therefore, if there is no magnetic inversion, the next generation of the magnetic field can be delayed until the record mark (i.e., the irradiation spot of the pulsed light) deviates from the magnetized area of the auxiliary recording layer, so that the heat of the magnetic head coil can be further reduced.

A first magnet-optical recording apparatus according to the present invention enables the above-mentioned first magnet-optical recording method. The apparatus includes means for detecting a magnetic inversion of data to be recorded and means for reducing an exciting energy of a magnetic head coil that generates the magnetic field in accordance with an output signal of the means for detecting a magnetic inversion of data.

In an embodiment, the exciting circuit of the magnetic head coil has a plurality of current paths that are connected in parallel, and the means for reducing an exciting energy cut off a part or all of the current paths so that the exciting energy of the magnetic head coil is reduced.

In another embodiment, an exciting circuit for the magnetic head coil includes a switching device that is driven by a pulse so as to generate the pulsed magnetic field, and the means for reducing an exciting energy shorten the turned-on period of the switching device so that the exciting energy of the magnetic head coil is reduced.

A second magnet-optical recording apparatus according to the present invention enables the above-mentioned second magnet-optical recording method. The apparatus includes means for detecting a magnetic inversion of data to be recorded, an exciting circuit for a magnetic head coil, the circuit including a switching device that is driven by a pulse so as to generate the pulsed magnetic field, and a pulse generation circuit for generating a pulse that turns on the switching device for a short period when the magnetic inversion of data occurs, in accordance with an output signal of the means for detecting a magnetic inversion of data.

In a preferable embodiment, the pulse generation circuit includes a timer that starts when the magnetic inversion of data occurs, and a pulse is generated for turning on the switching device for a short period after a lapse of a predetermined period from the magnetic inversion of data, regardless of the presence or absence of another magnetic inversion of data. By this configuration, the variation of the second magnet-optical recording method can be realized mimetically by the timer, in which the next generation of the magnetic field is delayed until the record mark deviates from the magnetized area of the auxiliary recording layer.

DESCRIPTION OF THE PREFERRED EMBODIMENTS

Hereinafter, the present invention will be explained in detail with reference to embodiments and accompanied drawings.

First Embodiment

Figure 2:
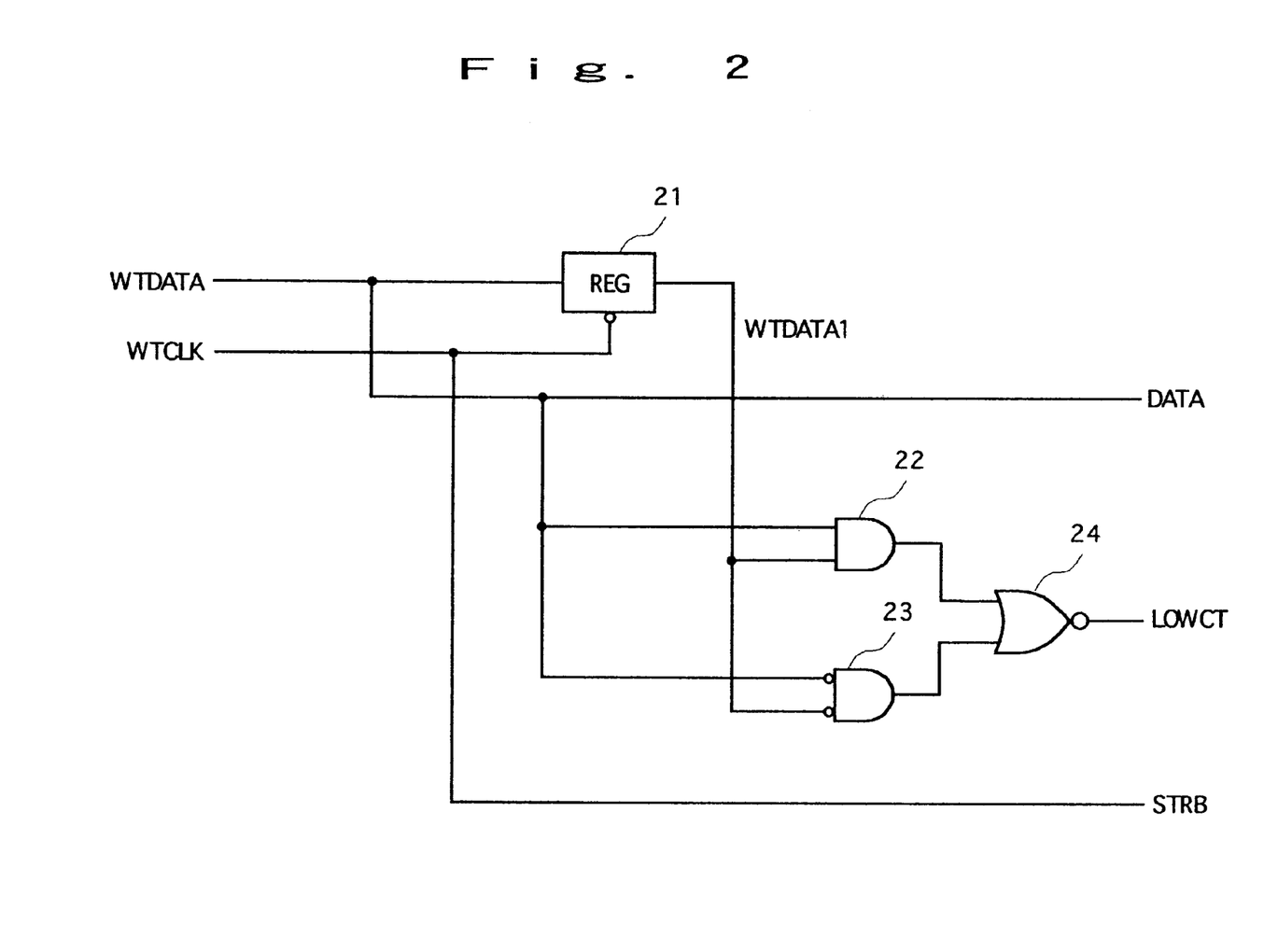
FIG. 2 shows a first half portion of a driving circuit for a magnetic head and a control signal generation circuit thereof in a magnet-optical recording apparatus according to a first embodiment of the present invention.
Figure 3:
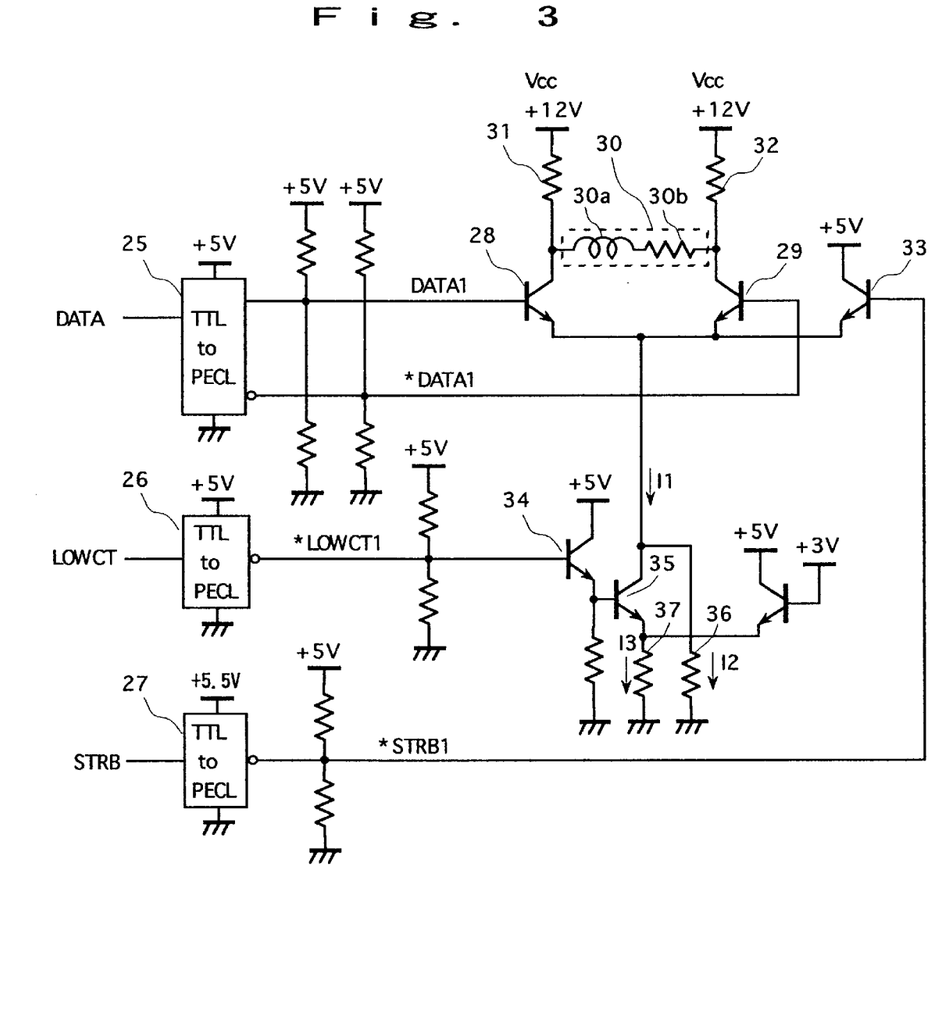
FIG. 3 shows a second half portion of a driving circuit for a magnetic head and a control signal generation circuit thereof in a magnet-optical recording apparatus according to a first embodiment of the present invention.

FIG. 2 and FIG. 3 show a driving circuit for a magnetic head and a control signal generation circuit thereof in a magnet-optical recording apparatus according to a first embodiment of the present invention. FIG. 3 shows a circuit including means for reducing an exciting energy (more specifically an exciting current) of a magnetic head coil in accordance with an output signal of the means for detecting a magnetic inversion of data. In addition, FIG. 4 is a timing chart for explaining the operations of the circuit shown in FIG. 2 and FIG. 3.

In FIG. 2, write data signal WTDATA to be recorded are supplied to the register 21, which outputs delayed write data signal WTDATA1 that was delayed till the falling edge of the write clock WTCLK. Timing waveforms of the write clock WTCLK, the write data signal WTDATA and the delayed write data signal WTDATA1 are shown in FIG. 4.

The write data signals WTDATA and WTDATA1 are supplied to an AND gate 22, which operates a logical multiplication of the signals. In addition, an AND gate 23 operates a logical multiplication of the inverted signal of the write data signal WTDATA and the inverted signal of the write data signal WTDATA1. An OR gate 24 operates a logical addition of the output signal of the AND gate 22 and the output signal of the AND gate 23. The OR gate 24 outputs the inverted signal of the logical addition as a signal LOWCT that instructs reduction of the exciting current.

Figure 4:
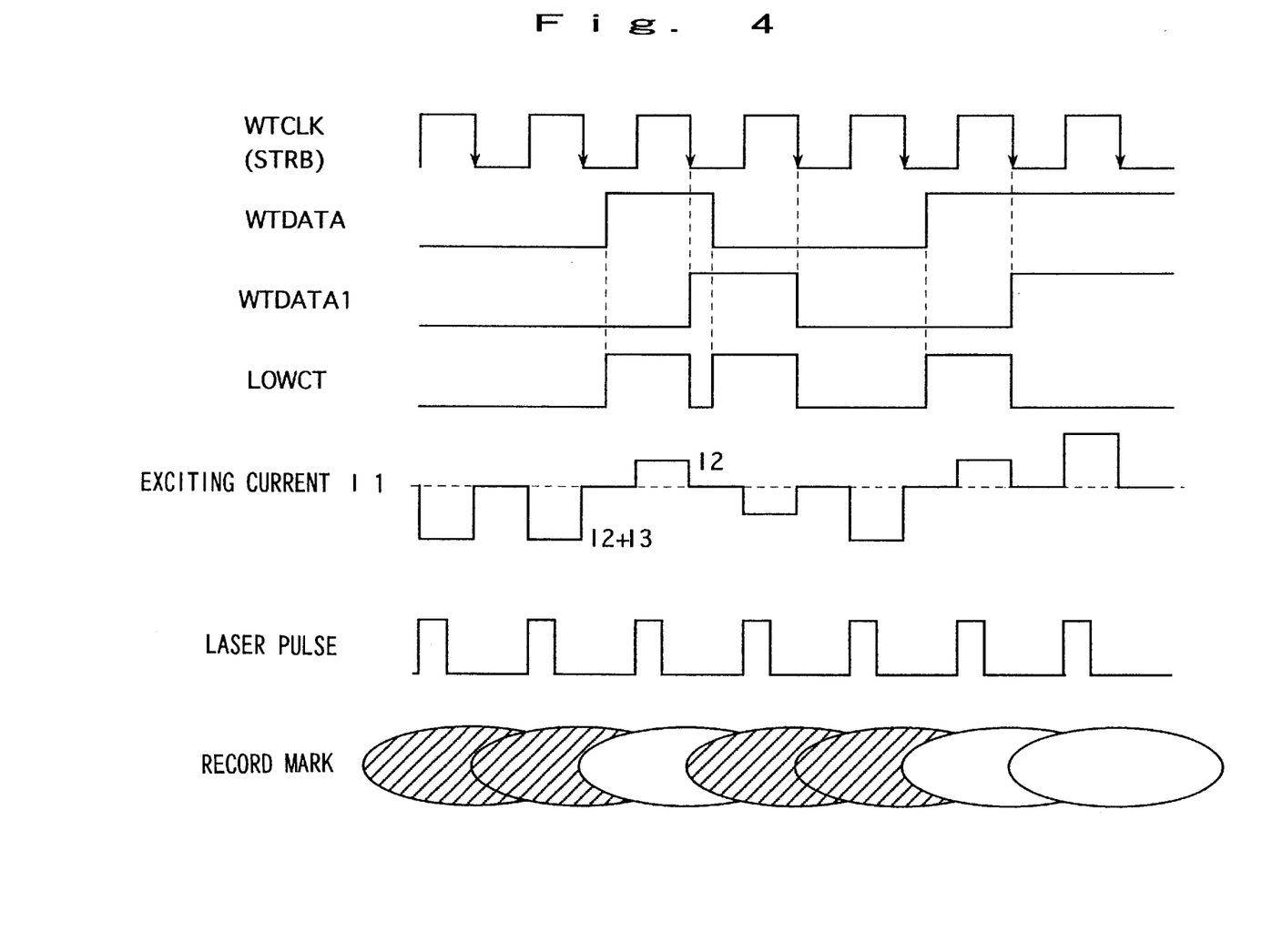
FIG. 4 is a timing chart for explaining the operation of the circuit shown in FIGS. 2 and 3.

Therefore, as shown in FIG. 4 that is a timing chart, the exciting current reduction instructing signal LOWCT becomes the high level when an inversion of the write data signal occurs (i.e., when the levels of the signals WTDATA and WTDATA1 are different), while the exciting current reduction instructing signal LOWCT becomes the low level when no inversion of the write data signal occurs (i.e., when the levels of the signals WTDATA and WTDATA1 are the same). The write data signal WTDATA is given to the circuit of FIG. 3 as a write control signal DATA, and the write clock signal WTCLK is given to the circuit of FIG. 3 as a strobe signal STRB that restricts the exciting period of the magnetic head coil.

In the circuit shown in FIG. 3, reference numerals 25–27 denote drivers (level converters) for converting TTL (transistor—transistor logic) level signals to PECL (positive emitter coupled logic) level signals.

The driver 25 generates PECL level write control signal DATA1 and its inverted signal *DATA1 from the write control signal DATA and gives the generated signals to the base of the transistor 28 or 29 that constitutes the driving circuit of the magnetic head. Collectors of the transistors 28 and 29 are connected to the ends of the magnetic head coil 30. The magnetic head coil 30 has an inductance component 30a and a direct current resister component 30b. In this embodiment, the exciting current that is supplied to the magnetic head coil 30 is reduced when an inversion of the write data signal occurs (i.e., when the exciting current reduction instructing signal LOWCT is the high level), so that the heat due to the direct current resister component 30b is reduced.

In addition, the collectors of the transistors 28 and 29 are connected to the 12-volt power source Vcc via resistors 31 and 32, respectively. Therefore, when the signal DATA1 is the high level, the transistor 28 is turned on, and the exciting current flows in the magnetic head coil 30 in the direction from the power source Vcc to the transistor 28 via the resistor 32 (the leftward direction in FIG. 3). In contrast, when the inverted signal *DATA1 is the high level, the transistor 29 is turned on, and the exciting current flows in the magnetic head coil 30 in the direction from the power source Vcc to the transistor 29 via resistor 31 (the rightward direction in FIG. 3).

However, when a transistor 33 is turned on, the exciting current does not flow in either direction. The base of the transistor 33 is connected to the output of the driver 27. The driver 27 generates a PECL level inverted signal *STRB1 from the strobe signal STRB (i.e., the write clock WTCLK) and give the signal to the base of the transistor 33. Therefore, when the strobe signal STRB is the low level, the inverted signal *STRB1 becomes the high level, and the transistor 33 is turned on, so that the exciting current cannot flow in the magnetic head coil 30. In contrast, the exciting current flows in the magnetic head coil 30 during the period while the strobe signal STRB is the high level (see FIG. 4).

The driver 26 generates PECL level inverted signal *LOWCT1 from the exciting current reduction instructing signal LOWCT and gives the signal to the base of the transistor 34. Transistors 34 and 35 constitute a Darlington circuit, and the transistor 35 is inserted in the exciting circuit for the magnetic head coil 30. The exciting current I1 of the magnetic head coil 30 that flows transistor 28 or 29 is divided into two currents. One is a current I2 that flows in a resistor 36 and another is a current I3 that flows in a transistor 35 and a resistor 37. Namely, the current I2 plus the current I3 is the current I1.

When the exciting current reduction instructing signal LOWCT is the high level, the inverted signal *LOWCT1 is the low level, so the transistors 34 and 35 are turned off (I3=0). Therefore, I1=I2. When the exciting current reduction instructing signal LOWCT is the low level, the current I1 is the sum of the currents I2 and I3. As shown in FIG. 4, when an inversion of the write data signal WTDATA occurs, the exciting current reduction instructing signal LOWCT becomes the high level, and the exciting current I1 of the magnetic head coil 30 is reduced from I2+I3 to I2. As a result, the heat of the magnetic head coil 30 is reduced. It is because the heat quantity is proportional to $I1^2 R$ where P is the resistance of the direct current resister component 30b of the magnetic head coil 30.

As an example, if the probability of 0 and 1 in a record pattern is fifty—fifty, the probability of the magnetic inversion of the write data is 50%. Therefore, if the exciting current when the magnetic inversion occurs is reduced by ½ (i.e., if I2=I3, and the power is reduced to ¼), the average consumption power can be reduced to 0.5×1+(1−0.5)×¼= 0.625.

Second Embodiment

Figure 5:
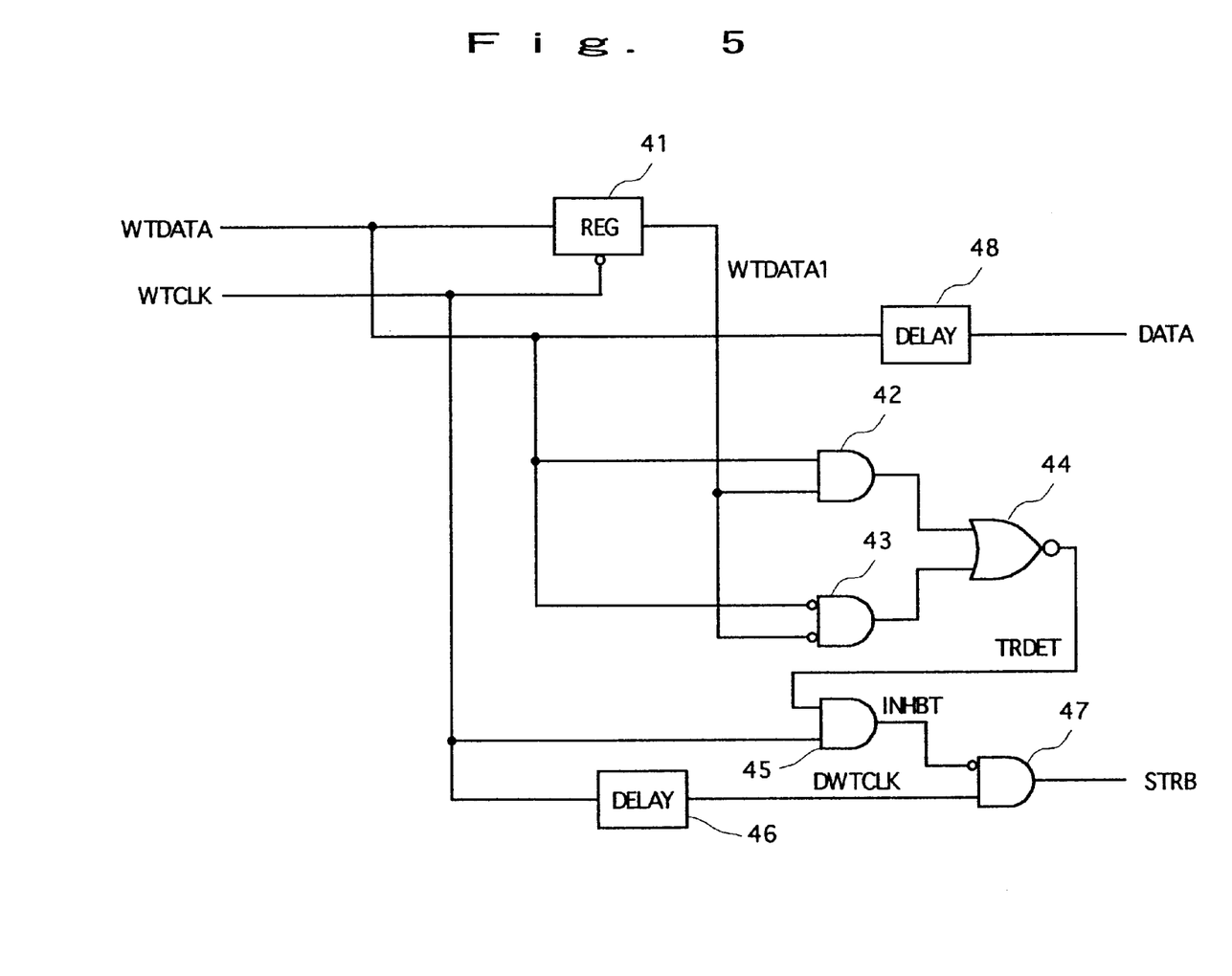
FIG. 5 shows a first half portion of a driving circuit for a magnetic head and a control signal generation circuit thereof in a magnet-optical recording apparatus according to a second embodiment of the present invention.
Figure 6:
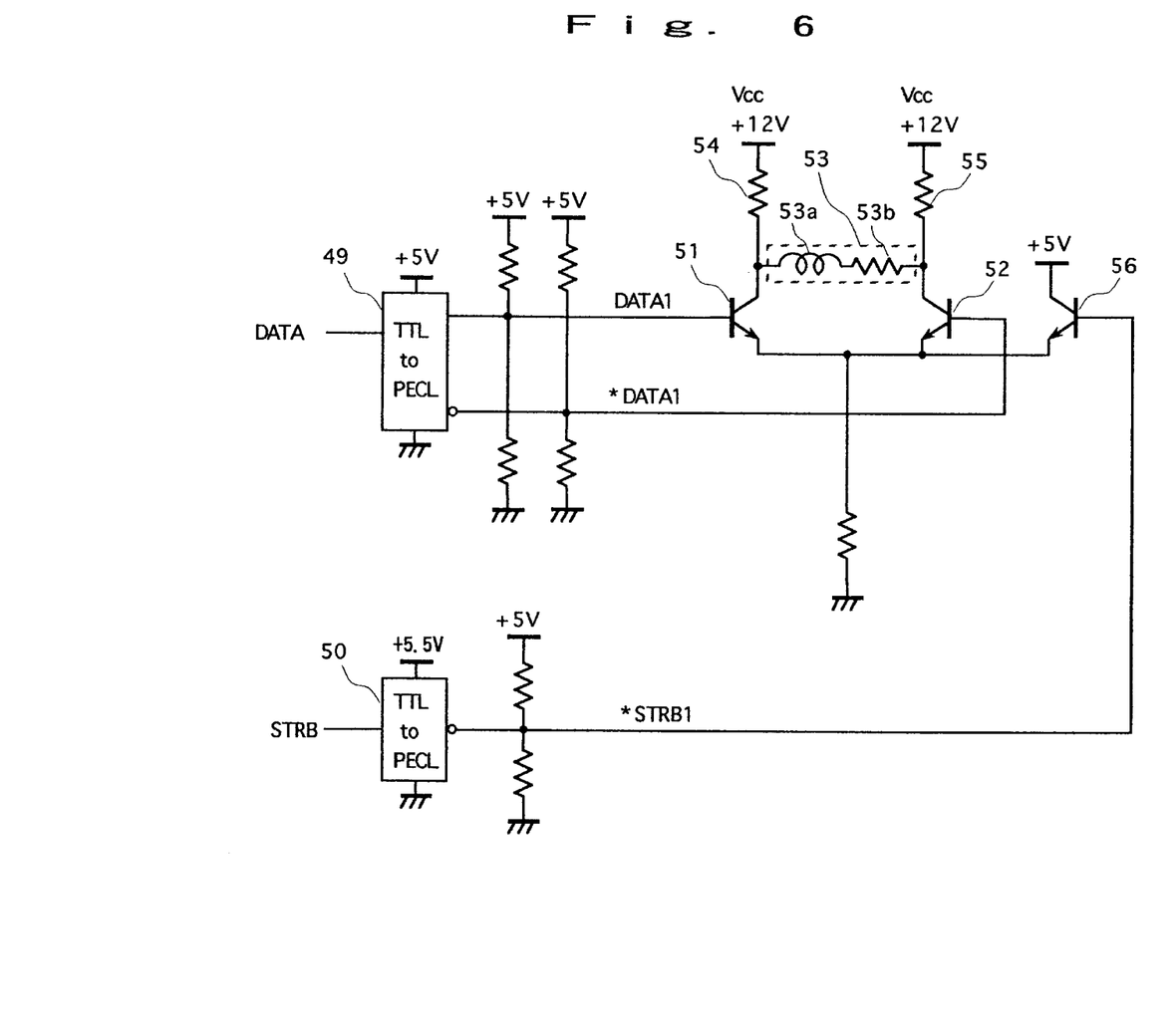
FIG. 6 shows a second half portion of a driving circuit for a magnetic head and a control signal generation circuit thereof in a magnet-optical recording apparatus according to a second embodiment of the present invention.
Figure 7:
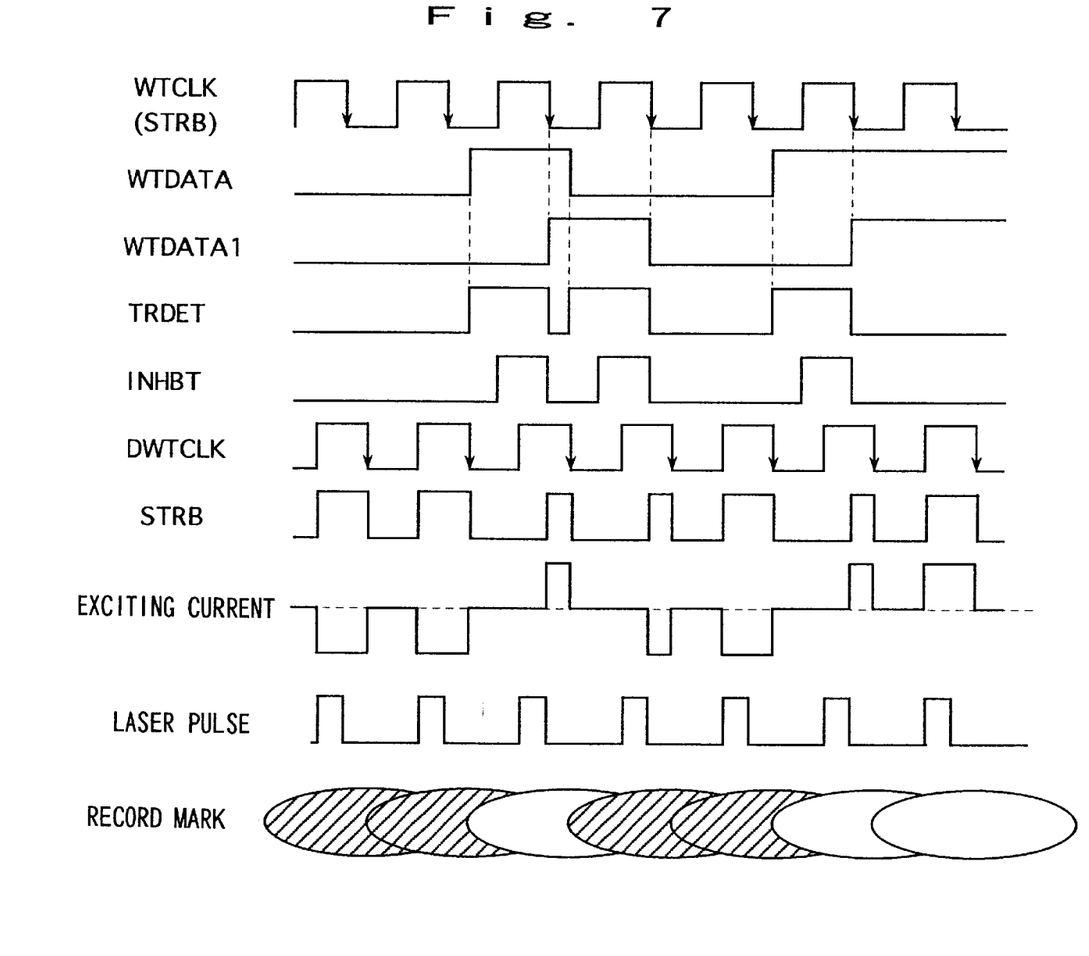
FIG. 7 is a timing chart for explaining the operation of the circuit shown in FIGS. 5 and 6.

FIG. 5 and FIG. 6 show a driving circuit for a magnetic head and a control signal generation circuit thereof in a magnet-optical recording apparatus according to a second embodiment of the present invention. The circuit shown in FIG. 5 includes means for detecting a magnetic inversion of data to be recorded and a circuit that generates a signal for shortening the exciting period of the magnetic head coil when a magnetic inversion occurs. FIG. 6 shows a driving circuit for the magnetic head coil. FIG. 7 is a timing chart for explaining the operation of the circuit shown in FIG. 5 and FIG. 6.

In the circuit of FIG. 5, a write data signal WTDATA to be recorded is given to the register 41, which outputs a write data signal WTDATA1 that is delayed till the falling edge of the write clock WTCLK. The timing waveforms of the write clock WTCLK, the write data signal WTDATA and the write data signal WTDATA1 are shown in FIG. 7.

The write data signals WTDATA and WTDATA1 are supplied to an AND gate 42, which operates a logical multiplication of these signals. In addition, an AND gate 43 operates a logical multiplication of the inverted signal of the write data signal WTDATA and the inverted signal of the write data signal WTDATA1. An OR gate 44 operates a logical addition of the output signal of the AND gate 42 and the output signal of the AND gate 43. The OR gates outputs the inverted signal of the logical addition as an inversion detecting signal TRDET.

Therefore, as shown in FIG. 7 that is a timing chart, the inversion detecting signal TRDET becomes the high level when an inversion of the write data signal occurs (i.e., when the levels of the signals WTDATA and WTDATA1 are different), while the inversion detecting signal TRDET becomes the low level when no inversion of the write data signal occurs (i.e., when the levels of the signals WTDATA and WTDATA1 are the same).

In addition, an AND gate 45 operates a logical multiplication of the inversion detecting signal TRDET and the write clock WTCLK. Furthermore, as shown in FIG. 7 that is a timing chart, a delay circuit 46 generates a delayed signal DWTCLK of the write clock WTCLK. An AND gate 47 operates a logical multiplication of the inverted signal of the output signal INHBT of the AND gate 45 and the delayed write clock DWTCLK, and the output of the AND gate 47 is given to the circuit of FIG. 6 as the strobe signal STRB that restricts the exciting period of the magnetic head coil. In addition, a delayed signal of the write data signal WTDATA that was delayed by the delay circuit 48 is given to the circuit of FIG. 6 as the write control signal DATA.

In the circuit shown in FIG. 6, reference numerals 49 and 50 denote drivers (level converters) for converting TTL (transistor—transistor logic) level signals to PECL (positive emitter coupled logic) level signals.

The driver 49 generates PECL level write control signal DATA1 and its inverted signal *DATA1 from the write control signal DATA and gives the generated signals to the base of the transistor 51 or 52 that constitutes the magnetic head driving circuit. Collectors of the transistors 51 and 52 are connected to the ends of the magnetic head coil 53. The magnetic head coil 53 has an inductance component 53a and a direct current resister component 53b. In this embodiment, the exciting period of the magnetic head coil 53 is shortened when an inversion of the write data signal occurs, so that the heat due to the direct current resister component 53b is reduced.

The collectors of the transistors 51 and 52 are connected to the 12 volt power source Vcc via resistors 54 and 55, respectively. Therefore, when the signal DATA1 is the high level, the transistor 51 is turned on, and the exciting current flows in the magnetic head coil 53 in the direction from the power source Vcc to the transistor 51 via the resistor 55 (the leftward direction in FIG. 3). In contrast, when the inverted signal *DATA1 is the high level, the transistor 52 is turned on, and the exciting current flows in the magnetic head coil 53 in the direction from the power source Vcc to the transistor 52 via the resister 54 (the rightward direction in FIG. 3).

However, when a transistor 56 is turned on, the exciting current does not flow in either direction. The base of the transistor 56 is connected to the output of the driver 50. The driver 50 generates PECL level inverted signal *STRB1 from the strobe signal STRB and gives the signal to the base of the transistor 56. Therefore, when the strobe signal STRB is the low level, the inverted signal *STRB1 becomes the high level, and the transistor 56 is turned on, so that the exciting current cannot flow in the magnetic head coil 53. In contrast, the exciting current flows in the magnetic head coil 53 while the strobe signal STRB is the high level (see FIG. 7).

As shown in FIG. 7, the high level period of the strobe signal STRB is shortened along with an inversion of the write data signal (when the inversion detecting signal TRDET becomes the high level) by the above-mentioned operation of the circuit shown in FIG. 5. As a result, the exciting period of the magnetic head coil 53 is shortened when an inversion of the write data signal occurs. Thus, the heat generated by the direct current resister component 53b of the magnetic head coil 53 is reduced.

Third Embodiment

Figure 8:
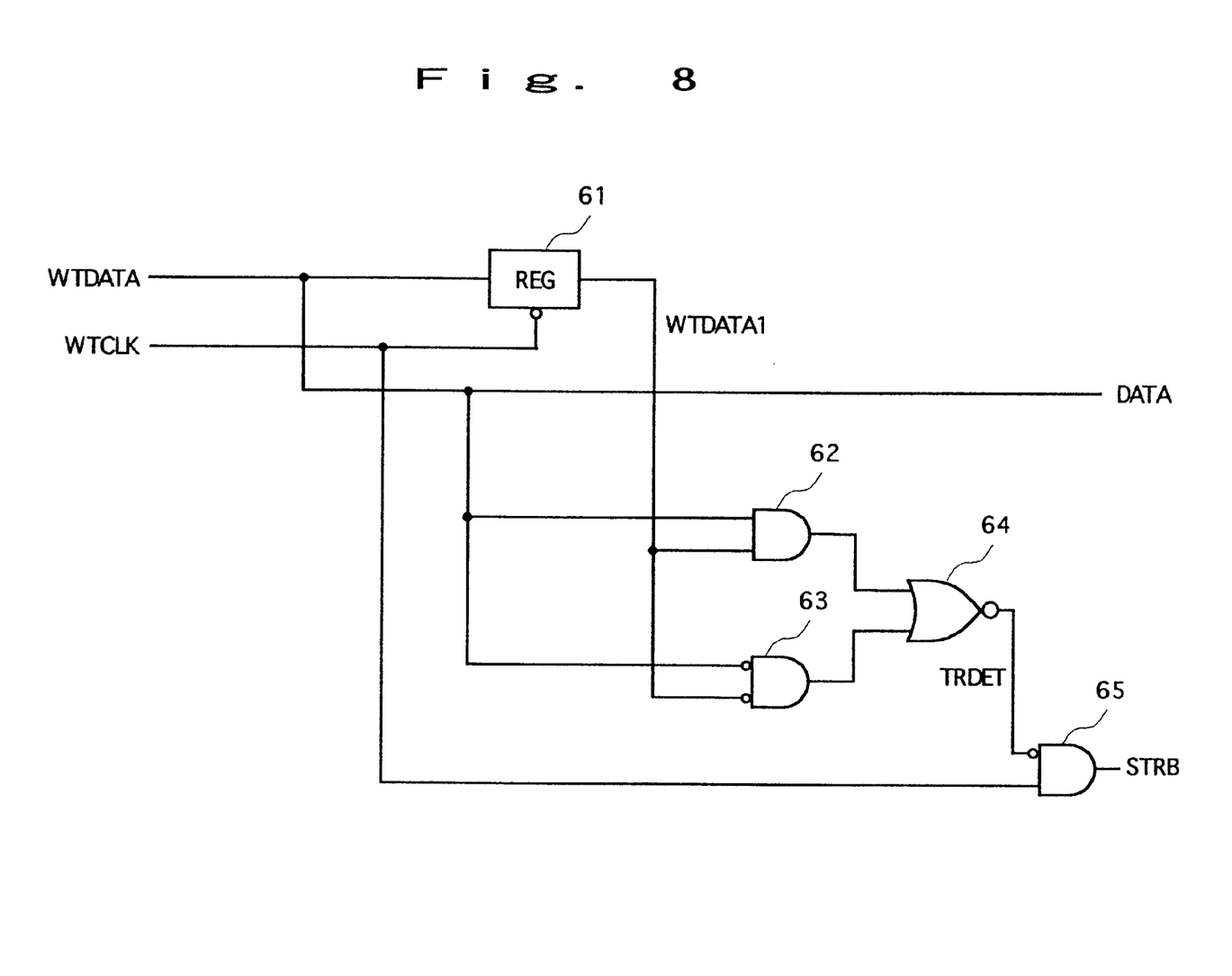
FIG. 8 shows a control signal generation circuit of a magnetic head driving circuit in a magnet-optical recording apparatus according to a third embodiment of the present invention.
Figure 9:
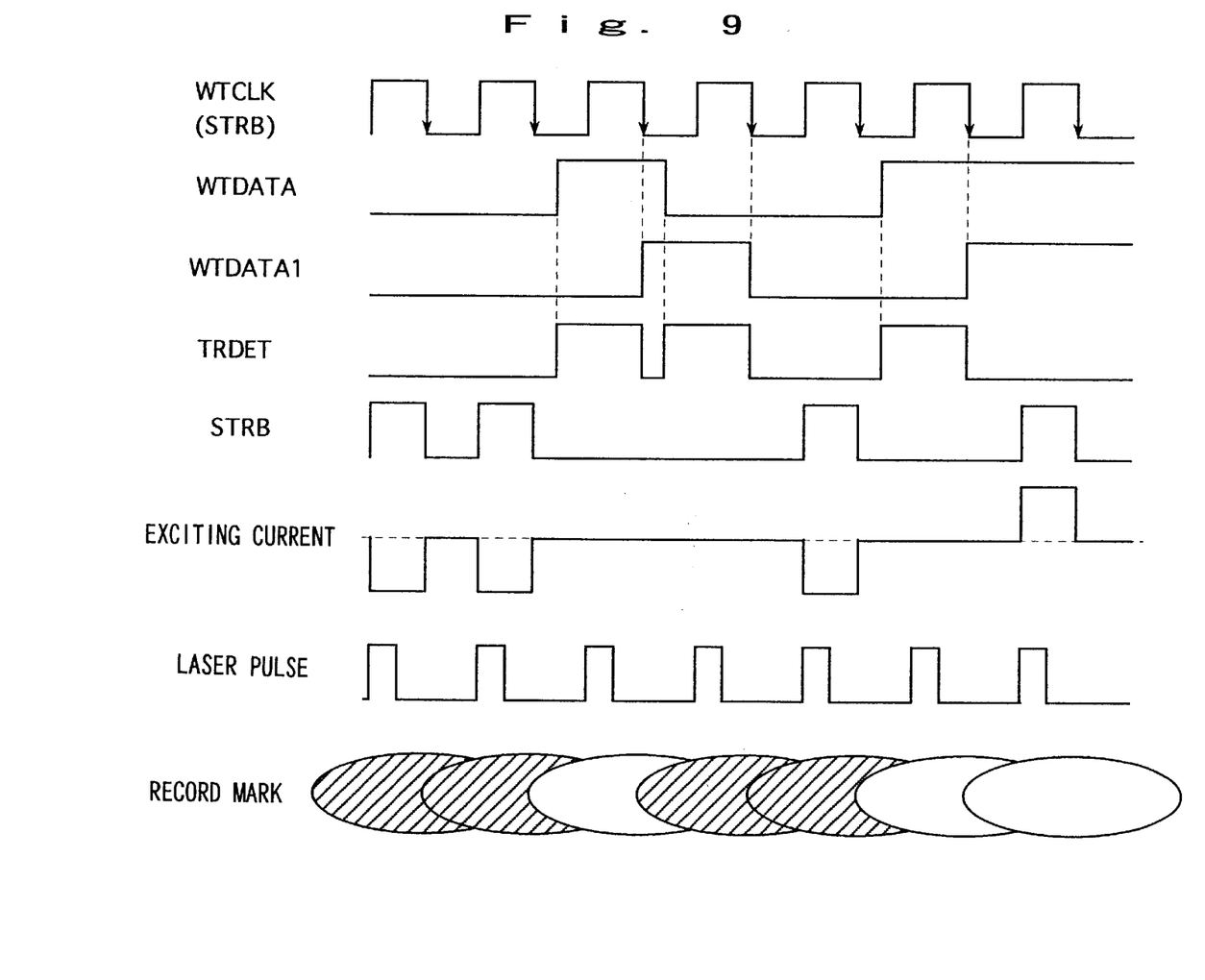
FIG. 9 is a timing chart for explaining the operation of the circuit shown in FIG. 8.

FIG. 8 shows a control signal generation circuit of a magnetic head driving circuit in a magnet-optical recording apparatus according to a third embodiment of the present invention. The driving circuit for the magnetic head coil following this circuit is the same as the circuit of the second embodiment shown in FIG. 6. The circuit shown in FIG. 8 includes data inversion detection means for detecting the magnetic inversion of data to be recorded and a circuit that generates a signal for eliminating an excitation of the magnetic head coil when a magnetic inversion occurs. FIG. 9 is a timing chart for explaining an operation of the circuit shown in FIG. 8.

In the circuit of FIG. 8, a write data signal WTDATA to be recorded is supplied to a register 61, which outputs a write data signal WTDATA1 that is delayed till the falling edge of the write clock WTCLK. Timing waveforms of the write clock WTCLK, the write data signal WTDATA and the write data signal WTDATA1 are shown in FIG. 9.

The write data signals WTDATA and WTDATA1 are supplied to an AND gate 62, which operates a logical multiplication of these signals. In addition, an AND gate 63 operates a logical multiplication of the inverted signal of the write data signal WTDATA and the inverted signal of the write data signal WTDATA1. An OR gate 64 operates a logical addition of the output signal of the AND gate 62 and the output signal of the AND gate 63 and outputs the inverted signal of the logical addition as an inversion detecting signal TRDET.

Therefore, as shown in FIG. 9 that is a timing chart, the inversion detecting signal TRDET becomes the high level when an inversion of the write data signal occurs (i.e., the levels of the write data signals WTDATA and WTDATA1 are different), while the inversion detecting signal TRDET becomes the low level when no inversion of the write data signal occurs (i.e., the levels of the write data signals WTDATA and WTDATA1 are the same).

In addition, an AND gate 65 operates a logical multiplication of the inverted signal of the inversion detecting signal TRDET and the write clock WTCLK (see FIG. 9). The output of the AND gate 65 is supplied to the driving circuit for the magnetic head coil as a strobe signal STRB that restricts the exciting period of the magnetic head coil (see FIG. 6). Furthermore, the write data signal WTDATA is given to the driving circuit for the magnetic head coil as a write control signal DATA.

As shown in FIG. 9, the high level period of the strobe signal STRB disappears when an inversion of the write data signal occurs (i.e., when the inversion detecting signal TRDET is the high level). As explained in the second embodiment with reference to FIG. 6, the exciting current flows in the magnetic head coil during the period in which the strobe signal STRB is the high level. Therefore, in this embodiment, the excitation of the magnetic head coil is eliminated when an inversion of the write data signal occurs (see FIG. 9). Thus, the heat generated by the direct current resister component (53b in FIG. 6) of the magnetic head coil (53 in FIG. 6) can be reduced.

Fourth Embodiment

Figure 10:
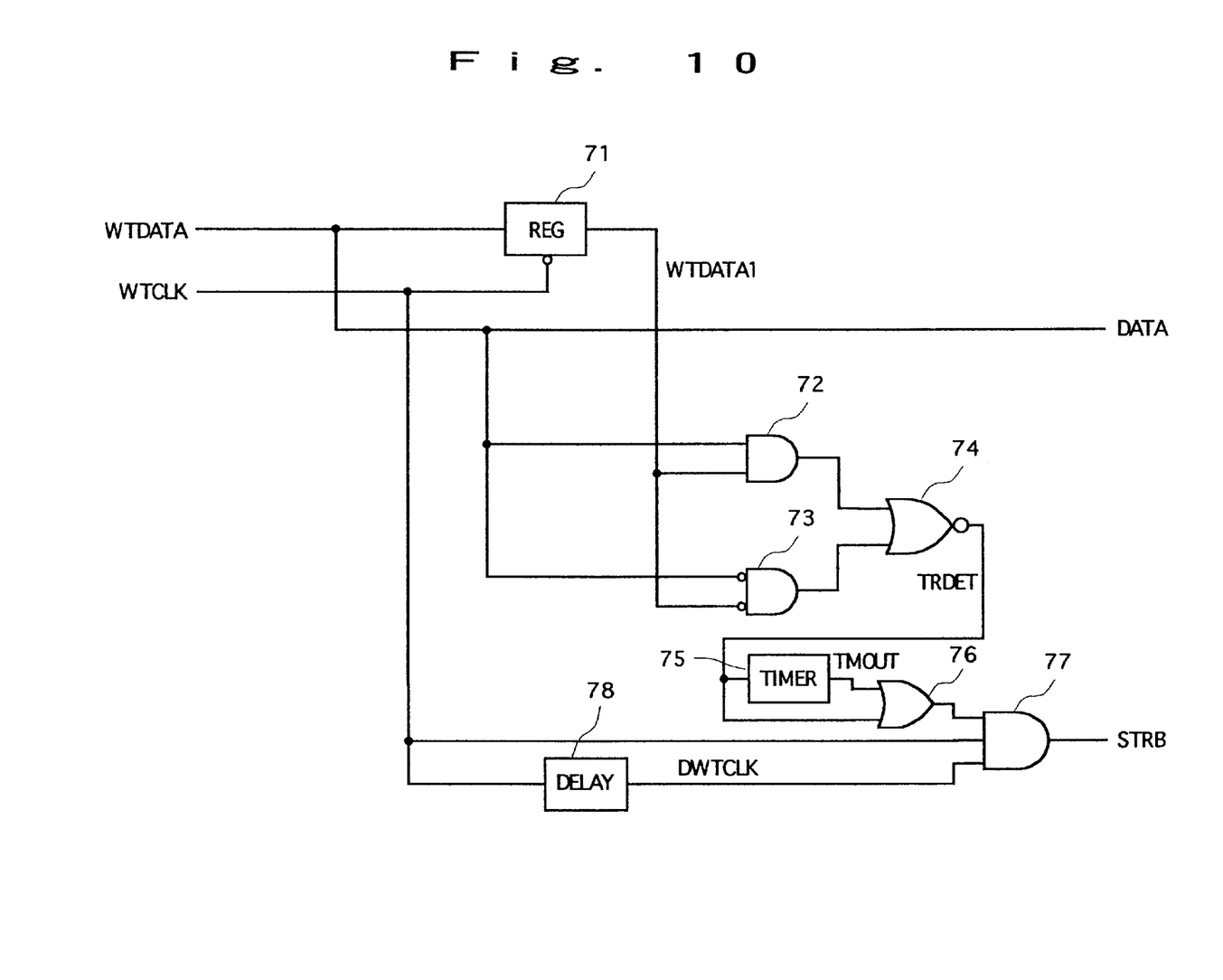
FIG. 10 shows a control signal generation circuit of a magnetic head driving circuit in a magnet-optical recording apparatus according to a fourth embodiment of the present invention.
Figure 11:
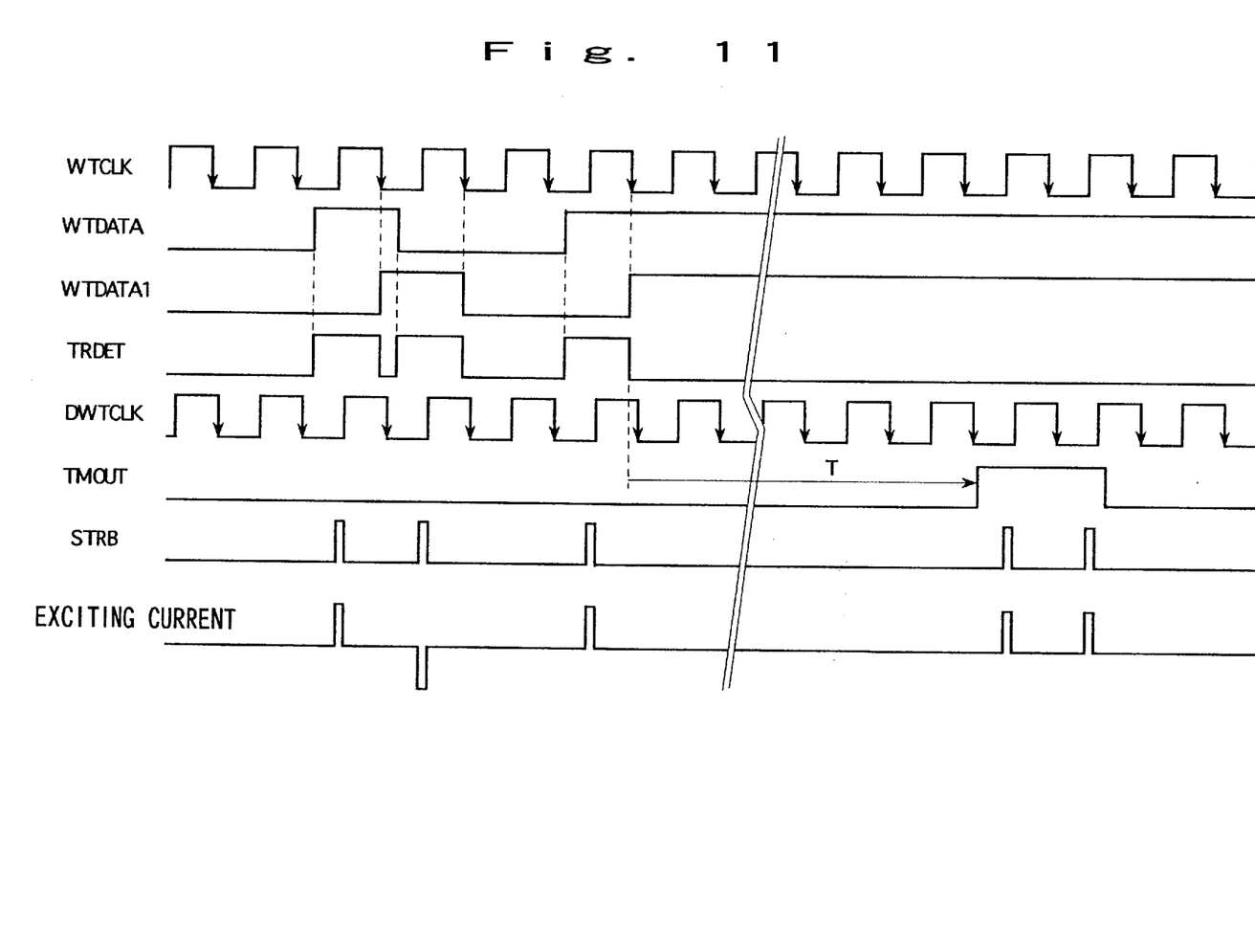
FIG. 11 is a timing chart for explaining the operation of the circuit shown in FIG. 10.

FIG. 10 shows a control signal generation circuit of a magnetic head driving circuit in a magnet-optical recording apparatus according to a fourth embodiment of the present invention. The driving circuit for the magnetic head coil following this circuit is the same as the circuit of the second embodiment shown in FIG. 6. The circuit shown in FIG. 10 includes data inversion detection means for detecting a magnetic inversion of data to be recorded and a circuit that generates a short pulse signal for exciting the magnetic head coil when a magnetic inversion occurs and when a predetermined time has passed from a magnetic inversion. FIG. 11 is a timing chart for explaining the operation of the circuit shown in FIG. 10.

This embodiment is different from the above-mentioned other embodiments in that a magnet-optical recording medium having an auxiliary recording layer is used. First, a magnetized mark is recorded on the auxiliary recording layer in accordance with write data by using a short pulsed magnetic field, and then a pulsed light beam is irradiated so as to transfer the magnetized mark of the auxiliary recording layer to the recording layer.

When recording a magnetized mark on the auxiliary recording layer, the exciting period of the magnetic head coil can be shortened. As a result, the heat due to the direct current resister component of the magnetic head coil can be suppressed and the power consumption can be reduced. For example, the power consumption can be reduced to ⅕ when the duty ration of the exciting period is 1/10 compared with the case where the exciting period is ½. This effect does not depend on a pattern of the write data.

In the circuit shown in FIG. 10, a write data signal WTDATA to be recorded is supplied to a register 71, which outputs a write data signal WTDATA1 that is delayed till the falling edge of the write clock WTCLK. Timing waveforms of the write clock WTCLK, the write data signal WTDATA and the write data signal WTDATA1 are shown in FIG. 11.

The write data signals WTDATA and WTDATA1 are supplied to an AND gate 72, which operates a logical multiplication of these signals. In addition, an AND gate 73 operates a logical multiplication of the inverted signal of the write data signal WTDATA and the inverted signal of the write data signal WTDATA1. An OR gate 74 operates a logical addition of the output signal of the AND gate 72 and the output signal of the AND gate 73 and outputs the inverted signal of the logical addition as an inversion detecting signal TRDET.

Therefore, as shown in FIG. 11 that is a timing chart, the inversion detecting signal TRDET becomes the high level when an inversion of the write data occurs (i.e., when the levels of the write data signals WTDATA and WTDATA1 are different), while the inversion detecting signal TRDET becomes the low level when no inversion of the write data occurs (i.e., when the levels of the write data signals WTDATA and WTDATA1 are the same).

The inversion detecting signal TRDET is supplied to a timer circuit 75, which outputs a signal TMOUT that becomes the high level for a predetermined period after a predetermined time has passed from the falling edge of the inversion detecting signal TRDET as shown in FIG. 11. If the inversion detecting signal TRDET becomes the high level in a predetermined period T, the timer circuit 75 is reset. Therefore, when no inversion of the write data signal occurs during the predetermined period T from the falling edge of the inversion detecting signal TRDET, a timer output signal TMOUT becomes the high level. An OR gate 76 operates a logical addition of the inversion detecting signal TRDET and the timer output signal TMOUT and the output of the OR gate 76 becomes an input of the three-input AND gate 77.

In addition, a delay circuit 78 generates a delayed signal DWTCLK of the write clock WTCLK so as to generate a short pulse signal. Then, the inverted signal of the delayed write clock DWTCLK as well as the write clock WTCLK is supplied to the three-input AND gate 77. The three-input AND gate 77 operates a logical multiplication of the output of the OR gate 76, the inverted signal of the write clock WTCLK and the delayed write clock DWTCLK, so as to output the strobe signal STRB. The strobe signal STRB restricts the exciting period of the magnetic head coil. Namely, in the driving circuit of the magnetic head coil (see FIG. 6), the magnetic head coil is excited during a period in which the strobe signal STRB is the high level.

In addition, the write data signal WTDATA is given to the driving circuit of the magnetic head coil as a write control signal DATA, which becomes a signal that determines the direction of the exciting current for the magnetic head coil (i.e., the polarity of the magnetic field to be generated).

As shown in FIG. 11 that is a timing chart, the strobe signal STRB becomes the high level for a short period when a magnetic inversion of the write data signal WTDATA occurs (i.e., when the inversion detecting signal TRDET is the high level) and when a predetermined time has passed from a magnetic inversion. Since the magnetic head coil is excited only during a short period in which the strobe signal STRB is the high level, the heat of the magnetic head coil and the power consumption can be reduced as mentioned above. The predetermined time T of the timer circuit 75 is set to a value till just before a record mark (i.e., an irradiation spot of the pulsed light) deviates from the magnetized area of the auxiliary recording layer when the irradiation spot of the pulsed light moves on the magnet-optical recording medium.

Fifth Embodiment

Figure 12:
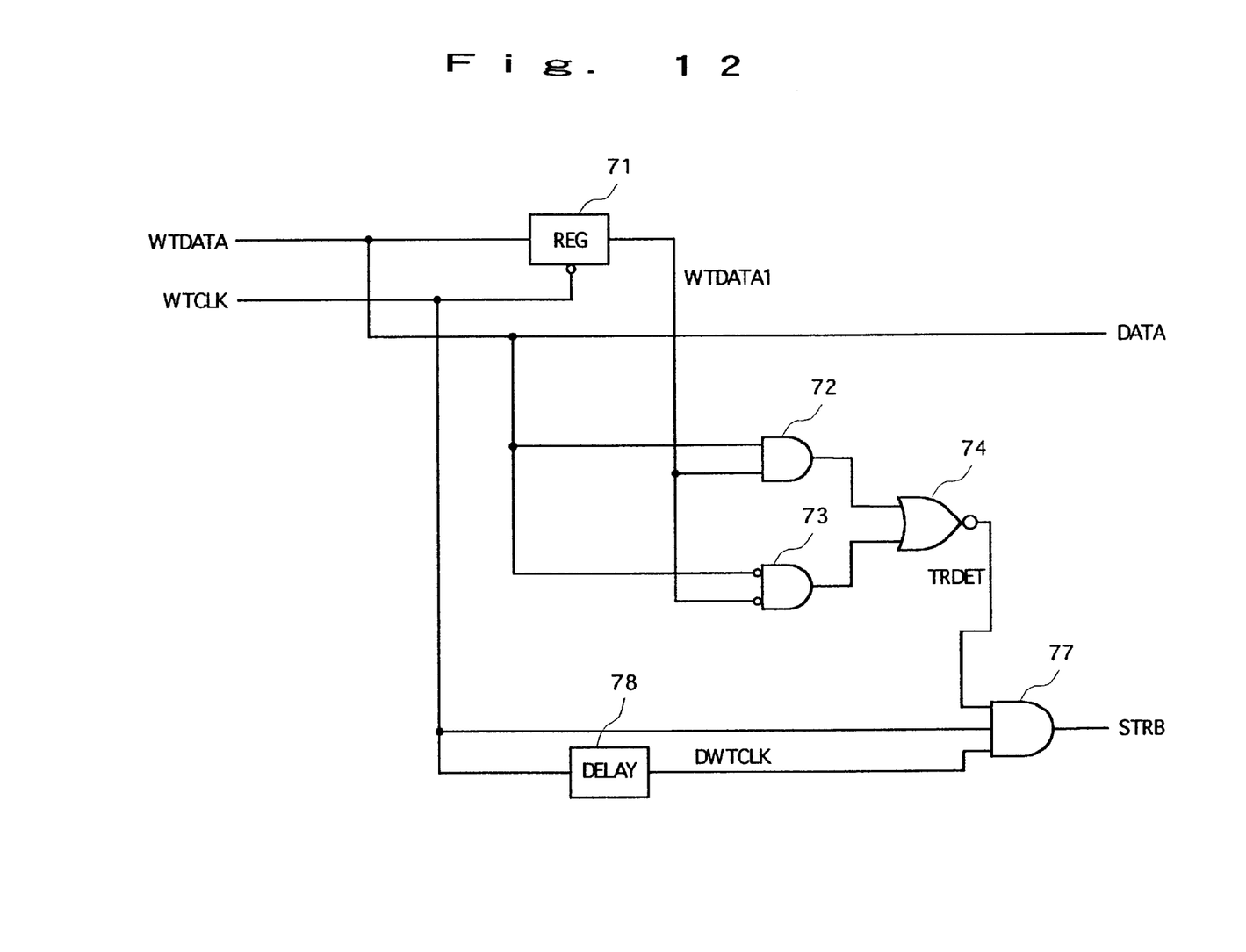
FIG. 12 shows a control signal generation circuit of a magnetic head driving circuit in a magnet-optical recording apparatus according to a fifth embodiment of the present invention.

FIG. 12 shows a control signal generation circuit of a magnetic head driving circuit in a magnet-optical recording apparatus according to a fifth embodiment of the present invention. This circuit equals to the circuit of the fourth embodiment shown in FIG. 10 except that the timer circuit 75 and the OR gate 76 in FIG. 10 are eliminated from this circuit shown in FIG. 12.

A size of the magnetized area of the auxiliary recording layer that is generated by one pulse excitation depends on a size of the magnetic head coil. However, if the length of the record mark is restricted by a code (e.g., a 1/7 code), and the longest mark is shorter than the above-mentioned magnetized area, the timer circuit 75 and the OR gate 76 that are necessary in the fourth embodiment are not necessary in this embodiment. It is because that the next magnetic inversion occurs without exception before the predetermined time T passes and the inversion detecting signal TRDET becomes the high level in this embodiment. In this case the circuit can be simplified by using the circuit of this embodiment as shown in FIG. 11.

As explained above, the method and the apparatus for magnet-optical recording according to the present invention, the heat of the magnetic head coil in pulse driving and the power consumption are further reduced. As a result, the magnetic head can be further miniaturized.

While the presently preferred embodiments of the present invention have been shown and described, it will be understood that the present invention is not limited thereto, and that various changes and modifications may be made by those skilled in the art without departing from the scope of the invention as set forth in the appended claims.

What is claimed is:

1. A method for recording information on a magnet-optical recording medium, the method comprising the steps of:

irradiating a pulsed light beam onto the recording medium to record a magnetized mark;

detecting a bit inversion in the data to be recorded;

applying a pulsed magnetic field to the recording medium when the bit inversion occurs in the data to be recorded, and reducing the energy level for generating the pulsed magnetic field by utilizing a reverse magnetic field generated by the magnetized mark that was previously recorded just before a present magnetized mark in the magnetic recording layer so that the energy level for generating the pulsed magnetic field for recording the present magnetized mark becomes smaller than the energy level that was used for generating the pulsed magnetic field for recording the previous magnetized mark when recording the present magnetized mark in the polarity that is opposite to the polarity of the previous magnetized mark.

2. A method for recording information on a magnet-optical recording medium, the method comprising the steps of:

irradiating a pulsed light beam onto the recording medium to record a magnetized mark;

detecting a bit inversion in the data to be recorded;

applying a pulsed magnetic field to the recording medium when the bit inversion occurs in the data to be recorded, and reducing the energy level for generating the pulsed magnetic field by utilizing a reverse magnetic field generated by the magnetized mark that was previously recorded just before a present magnetized mark in the magnetic recording layer so that the energy level for generating the pulsed magnetic field for recording the present magnetized mark becomes smaller than the energy level that was used for generating the pulsed magnetic field for recording the previous magnetized mark when recording the present magnetized mark in the polarity that is opposite to the polarity of the previous magnetized mark;

wherein the energy reducing step includes a step of reducing exciting current that is supplied to a magnetic head coil for generating the pulsed magnetic field when the present mark is recorded in the polarity that is opposite to the polarity of the magnetized mark that was recorded just before the present mark.

3. A method for recording information on a magnet-optical recording medium, the method comprising the steps of:

irradiating a pulsed light beam onto the recording medium to record a magnetized mark;

detecting a bit inversion in the data to be recorded;

applying a pulsed magnetic field to the recording medium when the bit inversion occurs in the data to be recorded, and reducing the energy level for generating the pulsed magnetic field by utilizing a reverse magnetic field generated by the magnetized mark that was previously recorded just before a present magnetized mark in the magnetic recording layer so that the energy level for generating the pulsed magnetic field for recording the present magnetized mark becomes smaller than the energy level that was used for generating the pulsed magnetic field for recording the previous magnetized mark when recording the present magnetized mark in the polarity that is opposite to the polarity of the previous magnetized mark;

wherein the energy reducing step includes a step of reducing period of exciting a magnetic head coil for generating the magnetic field when the present mark is recorded in the polarity that is opposite to the polarity of the magnetized mark that was recorded just before the present mark.

4. A method for recording information on a magnet-optical recording medium, the method comprising the steps of:

irradiating a pulsed light beam onto the recording medium to record a magnetized mark;

detecting a bit inversion in the data to be recorded;

applying a pulsed magnetic field to the recording medium when the bit inversion occurs in the data to be recorded, and reducing the energy level for generating the pulsed magnetic field by utilizing a reverse magnetic field generated by the magnetized mark that was previously recorded just before a present magnetized mark in the magnetic recording layer so that the energy level for generating the pulsed magnetic field for recording the present magnetized mark becomes smaller than the energy level that was used for generating the pulsed magnetic field for recording the previous magnetized mark when recording the present magnetized mark in the polarity that is opposite to the polarity of the previous magnetized mark;

wherein the energy reducing step includes a step of pausing the supply of the exciting current to a magnetic head coil for generating the magnetic field when the present mark is recorded in the polarity that is opposite to the polarity of the magnetized mark that was recorded just before the present mark.

5. An apparatus for recording information on a magnet-optical recording medium by irradiating a pulsed light beam onto the recording medium and by applying a pulsed magnetic field to the recording medium, the apparatus comprising:

means for detecting a bit inversion in data to be recorded; and means for reducing an exciting energy level of a magnetic head coil that generates the pulsed magnetic field in accordance with an output signal of the detecting means so that the energy level for generating the pulsed magnetic field for recording a present magnetized mark becomes smaller than the energy level that was used for generating the pulsed magnetic field for recording a previous magnetized mark when the present magnetized mark is recorded in the polarity that is opposite to the polarity of the magnetized mark that was previously recorded just before the present magnetized mark.

6. The apparatus according to claim 5 further comprising an exciting circuit for the magnetic head coil, wherein the circuit includes a plurality of current paths that are connected in parallel and the reducing means cuts off a part or all of the current paths so that the exciting energy of the magnetic head coil is reduced.

7. The apparatus according to claim 5 further comprising an exciting circuit for the magnetic head coil, wherein the circuit includes a switching device that is driven by a pulse so as to generate the pulsed magnetic field and the reducing means shortens the turned-on period of the switching device so that the exciting energy of the magnetic head coil is reduced.

* * * * *